United States Patent [19]

Kawata et al.

[11] Patent Number: 4,931,939
[45] Date of Patent: Jun. 5, 1990

[54] CONSTANT-SPEED RUNNING CONTROLLER

[75] Inventors: Shoji Kawata, Okazaki; Osamu Miyake, Nishikamo; Nobuyasu Suzumura, Toyota; Motohide Takeuchi, Tokoname, all of Japan

[73] Assignee: Aisin Seiki Kabushiki Kaisha, Aichi, Japan

[21] Appl. No.: 171,338

[22] Filed: Mar. 21, 1988

[30] Foreign Application Priority Data

Mar. 20, 1987 [JP] Japan .................................. 62-67265

[51] Int. Cl.[5] ............................................ B60K 31/04
[52] U.S. Cl. .............................. 364/426.04; 364/424.1; 123/352; 180/179
[58] Field of Search ............... 364/426.04, 431.07, 364/424.1; 74/866; 123/352; 180/176, 179

[56] References Cited

U.S. PATENT DOCUMENTS

| | | | |
|---|---|---|---|
| 3,893,537 | 7/1975 | Sakakibara | 180/176 |
| 4,463,822 | 8/1984 | Tanigawa et al. | 74/866 |
| 4,535,864 | 8/1985 | Tanigawa et al. | 74/866 |
| 4,535,865 | 8/1985 | Tanigawa et al. | 74/866 |
| 4,560,024 | 12/1985 | Noda et al. | 74/866 |
| 4,729,356 | 3/1988 | Kaneko et al. | 180/179 |

FOREIGN PATENT DOCUMENTS

| | | |
|---|---|---|
| 109849 | 8/1980 | Japan . |
| 37144 | 3/1982 | Japan . |
| 58-98636 | 6/1983 | Japan . |
| 59-58134 | 4/1984 | Japan . |
| 60-76429 | 4/1985 | Japan . |
| 61-30427 | 2/1986 | Japan . |

Primary Examiner—Gary Chin
Attorney, Agent, or Firm—Sughrue, Mion, Zinn, Macpeak & Seas

[57] ABSTRACT

A constant-speed running controller for maintaining the running speed of a vehicle at a fixed level by regulating the degree of opening of the throttle valve of the vehicle. The constant-speed running controller comprises speed detectors for detecting the running speed of the vehicle, a shift position detecting switch for detecting the shift position of the shift lever, a mode selecting switch for switching the running mode of the vehicle between an automatic speed change control mode and an automatic speed change constant-speed running control mode, a throttle opening degree detector for detecting the degree of opening of the throttle valve, a brake switch for detecting the application of the brake system, a target running speed setting switch, a resume switch for restarting the previously established constant-speed running control mode, a constant-speed running mode selecting switch for selecting the constant-speed running control function, a microcomputer for processing data received from the foregoing switches and detectors and giving control signals to the functional devices for regulating the running speed of the vehicle. An effective target running speed for constant-speed running is determined on the basis of a temporary target running speed, an average running speed obtained by processing sample running speeds sampled in a predetermined time interval, and the difference between the temporary target running speed and the average running speed.

11 Claims, 13 Drawing Sheets

FIG. 9

MAP FOR PREVIOUS CORRECTION FOR RUNNING
MODE WITH AIR CONDITIONING SYSTEM INOPERATIVE

| TEMPORARY TARGET RUNNING SPEED(km/h) | PREVIOUS CORRECTION(km/h) |
|---|---|
| more than or equal to 40, less than 50 | 0.6 |
| more than or equal to 50, less than 60 | 0.7 |
| more than or equal to 60, less than 70 | 0.9 |
| more than or equal to 70, less than 80 | 1.0 |
| more than or equal to 80, less than 90 | 1.2 |
| more than or equal to 90, less than 100 | 1.4 |

FIG. 10

MAP FOR PREVIOUS CORRECTION FOR RUNNING
MODE WITH AIR CONDITIONING SYSTEM OPERATIVE

| TEMPORARY TARGET RUNNING SPEED(km/h) | PREVIOUS CORRECTION(km/h) |
|---|---|
| more than or equal to 40, less than 50 | 0.8 |
| more than or equal to 50, less than 60 | 0.9 |
| more than or equal to 60, less than 70 | 1.1 |
| more than or equal to 70, less than 80 | 1.2 |
| more than or equal to 80, less than 90 | 1.4 |
| more than or equal to 90, less than 100 | 1.6 |

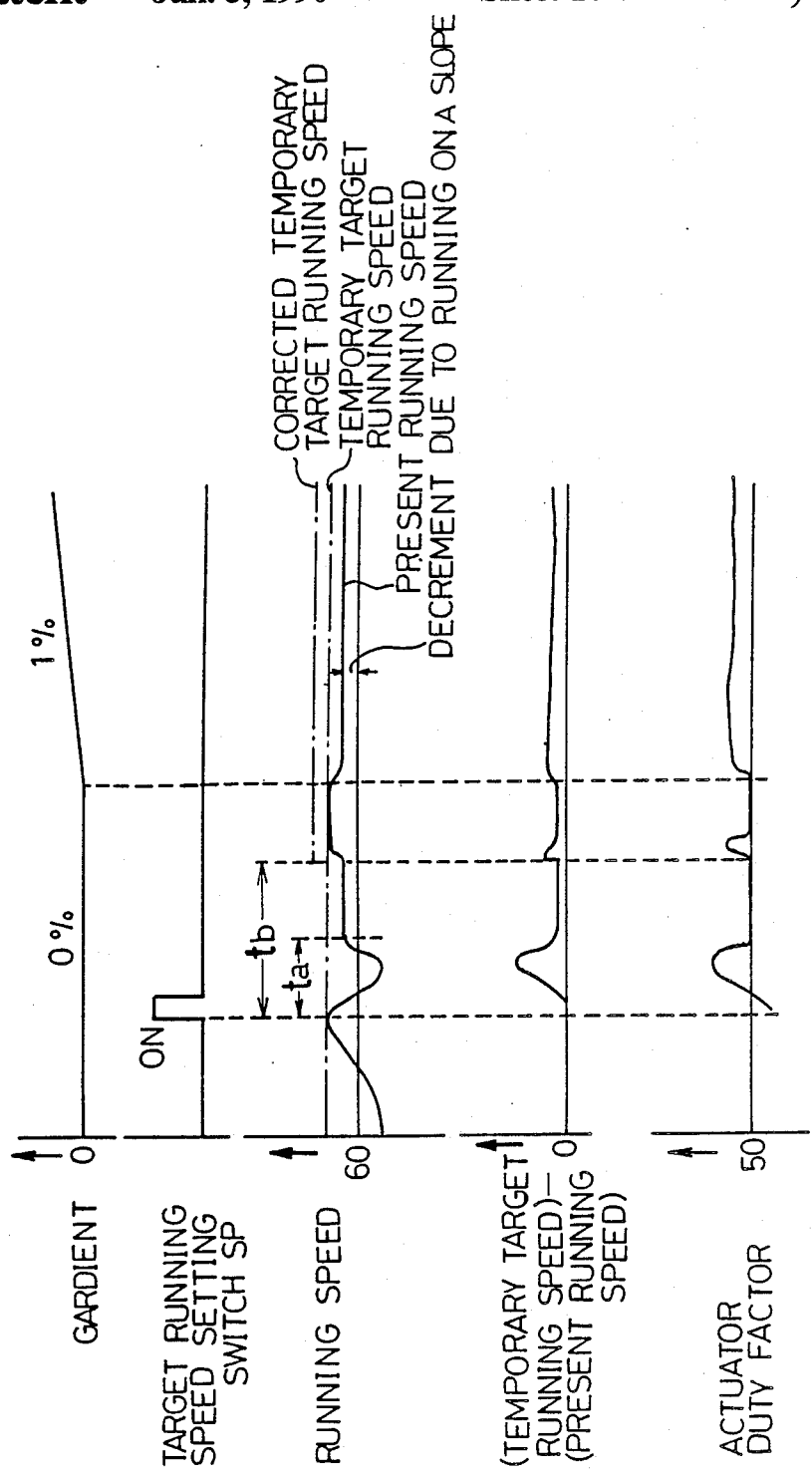

CONSTANT-SPEED RUNNING CONTROLLER

BACKGROUND OF THE INVENTION

1. Field of the Invention

The present invention relates to a constant-speed running controller which controls a throttle valve opening degree to maintain the running speed of a vehicle on a constant level.

2. Description of the Prior Art

Japanese Unexamined Patent Publication (Kokai) No. 76429/1985 discloses a constant-speed running controller which controls a throttle valve opening degree according to the condition of the road to maintain the present running speed of a vehicle for constant-speed running.

This known constant-speed running controller comprises a running speed detector, a storage device for storing a predetermined target running speed, an actuator for operating the throttle valve, a negative pressure applying device for applying a negative pressure to the actuator, including a negative pressure source and a vacuum pump, an electronic control unit which compares the present running speed of the vehicle with the predetermined target running speed stored in the storage device and controls the actuator so that the difference between the predetermined running speed and the present running speed is reduced to zero, and a pump driving device which starts driving the vacuum pump upon the increase of the controlled deviation, namely, the deviation of the present running speed from the predetermined target running speed, beyond a predetermined limit of deviation.

This known constant-speed running controller, however, is unable to control the constant-speed running mode of the vehicle efficiently at a high accuracy according to the running condition of the vehicle, because actual controlled running speed of the vehicle deviates from a predetermined target running speed due to the imperfect operating characteristics and unsatisfactory accuracy of the component control elements such as the running speed detector, the throttle valve and the actuator.

SUMMARY OF THE INVENTION

Accordingly, it is an object of the present invention to provide a constant-speed running controller eliminating the drawbacks of the known constant-speed running controller and capable of highly accurately controlling the running speed of a vehicle at an effective target running speed.

According to the present invention, when a target running speed setting switch is operated, the actual running speed of a vehicle is regulated at a desired running speed to store the desired running speed in a storage device as a temporary target running speed, and a running speed detector starts detecting the transitory actual running speed of the vehicle a predetermined time after the target running speed setting switch has been operated, and the average running speed in a predetermined time interval is compared with temporary target running speed stored in the storage device on an assumption that the average running speed is an effective target running speed, and the previously set temporary target running speed is corrected on the basis of the difference of the previously set temporary target running speed from the average running speed.

BRIEF DESCRIPTION OF THE DRAWINGS

The above and other objects, features and advantages of the present invention will become fully apparent from the following description taken in conjunction with the accompanying drawings, in which:

FIG. 9 is a previous correction map of corrections respectively for running speeds in a running mode in which the air conditioning system is inoperative;

FIG. 10 is a previous correction map of corrections respectively for running speeds in a running mode in which the air conditioning system is operative; and FIG. 11 is a time chart of assistance in explaining the action of the constant-speed running controller of FIG. 1.

DESCRIPTION OF THE PREFERRED EMBODIMENT

Figure 1:
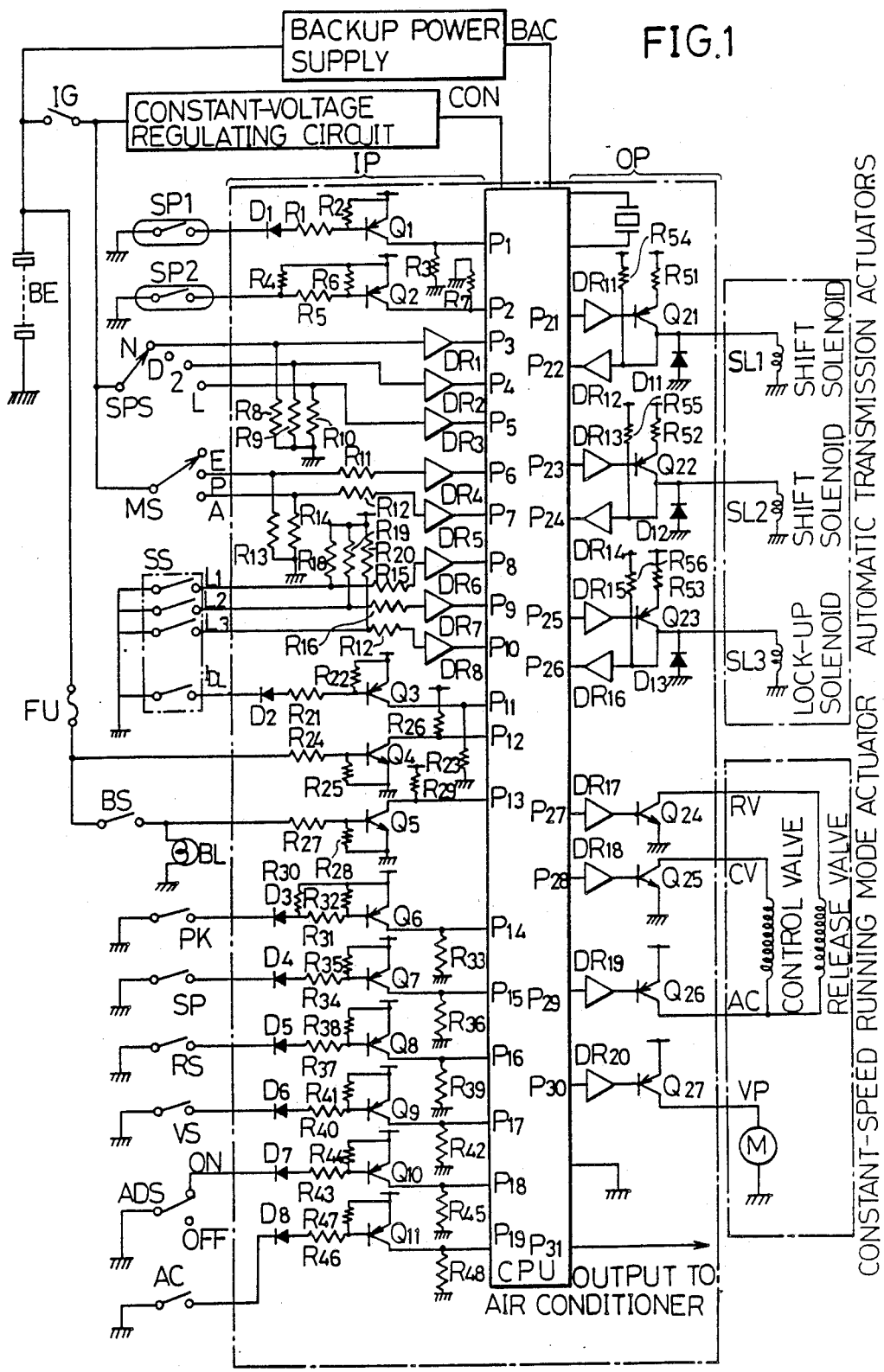
FIG. 1 is a circuit diagram of an electronic control circuit incorporated into a constant-speed running controller, in a preferred embodiment, according to the present invention.
Figure 2:
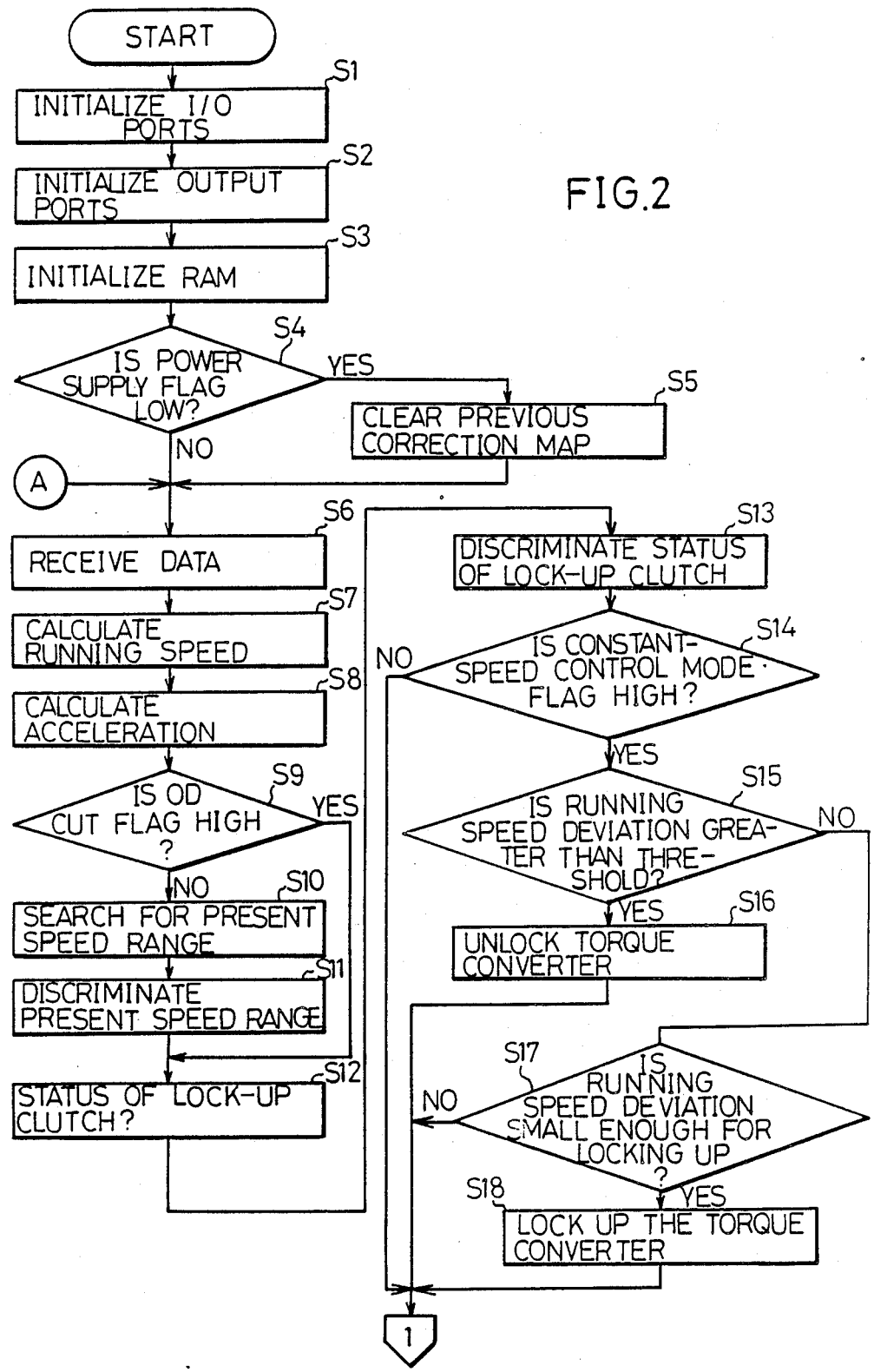
FIG. 2 is a flow chart of constant-speed running control routine including steps S1 through S18 to be executed by the constant-speed running controller of FIG. 1.

The present invention will be described in its preferred embodiment with reference to the accompanying drawings, in which like reference numerals denote like or corresponding parts throughout.

Referring to FIG. 1, an electronic control circuit incorporated into a constant-speed running controller of the present invention has a central processing unit (hereinafter referred to as "CPU"), such as a microcomputer, one-chip microcomputer or a microprocessor, comprising a control circuit, an arithmetic circuit and registers. A battery BE mounted on a vehicle is used as a DC power supply. Power is supplied through a constant-voltage regulating circuit CON to the CPU, an input interface circuit IP and an output interface circuit OP. When an ignition switch IG of the vehicle is closed, the constant-voltage regulating circuit CON is connected to the battery BE. The electronic control circuit is provided with a backup power supply BAC to hold a map of former corrected values for a running mode with the air conditioning system inoperative (FIG. 9) and a map of former corrected values for a running mode with the air conditioning system operative (FIG. 10), which are stored in a memory, in case the battery BE is dismounted from the vehicle. The condition of power supply is monitored and a power supply flag for the memory of the CPU is reset, namely, the power supply flag goes LOW, when both the battery BE and the backup battery BAC are disconnected simultaneously from the electronic control circuit.

A first speed detector SP1 has a reed switch associated with a magnet connected to the cable of the speedometer of the vehicle. The first speed detector SP1 generates a pulse signal of a frequency proportional to the running speed of the vehicle. A second speed detector SP2 has a reed switch associated with a magnet fixedly mounted on the output shaft of the automatic transmission of the vehicle. The second speed detector SP2 generates a pulse signal of a frequency proportional to the rotational speed of the output shaft of the automatic transmission. The first speed detector SP1 is connected through a diode D1 and a resistor R1 to the base of a transistor Q1. The transistor Q1 is ON when the reed switch of the first speed detector SP1 is ON, so that a voltage is applied across a resistor R3 and the input port P1 of the CPU goes HIGH. When the reed switch of the first speed detector SP1 is OFF, the transistor Q1 is OFF because a resistor R2 is connected to the collector of the transistor Q1, so that the terminal of the resistor R3 drops to ground potential and the input port P1 of the CPU goes LOW. The second speed detector SP2 is connected through a resistor R5 to the base of a transistor Q2. When the reed switch of the second speed detector SP2 is ON, the transistor Q2 is ON, so that a voltage is applied across a resistor R7 and the input port P2 of the CPU goes HIGH. When the reed switch of the second speed detector SP2 is OFF, the transistor Q2 is OFF because resistors R4 and R6 are connected to the collector of the transistor Q2, so that the resistor R7 drops to ground potential and the input port P2 of the CPU goes LOW.

A shift position detector SPS detects the position of the shift lever of the vehicle. The neutral position switch SPS-N, drive range position switch SPS-D, second speed position switch SPS-2 and first speed position switch SPS-1 of the shift position detector SPS correspond respectively to the neutral position, drive range position, second speed position and first speed position of the shift lever. The neutral position switch SPS-N, the second speed position switch SPS-2 and the first speed position switch SPS-1 are connected respectively to pull-down resistors R8, R9 and R10, and respectively to buffer amplifiers DR1, DR2 and DR3. When the shift lever is not shifted to the corresponding position, the outputs of the buffer amplifiers DR1, DR2 and DR3 go LOW, and the input ports P3, P4 and P5 of the CPU go LOW. When the shift lever is shifted to the neutral, second speed or first speed position, the neutral position switch SPS-N, the second position switch SPS-2 or the first speed position switch SPS-1 is ON, the battery BE is connected to the buffer amplifier DR1, DR2 or DR3, and the input port P3, P4 or P5 of the CPU goes HIGH.

A mode selector switch MS has positions E and P (corresponding to contacts E and P) for automatic speed change control modes, and a position A (corresponding to a contact A) for an automatic speed change and constant-speed running control mode. When the mode selector switch MS is in the position P, a buffer amplifier DR4 is connected through a resistor R11 to the battery BE, the output of the buffer amplifier DR4 goes HIGH and the input port P6 of the CPU goes HIGH. When the mode selector switch MS is in the position A, a buffer amplifier DR5 is connected through a resistor 12 to the battery BE, the output of the buffer amplifier DR5 goes HIGH, and the input port P7 of the CPU goes HIGH. When the mode selector switch MS is neither in the position P nor the position A, the buffer amplifiers DR4 and DR5 are disconnected to the battery BE and connected to pull-down resistors R13 and R14, the outputs of the buffer amplifiers DR4 and DR5 go LOW and the input ports P6 and P7 of the CPU go LOW.

A throttle valve opening degree detector SS detects the throttle valve opening degree, for example, through the detection of the shift of the accelerator pedal. The throttle valve opening degree detector SS provides throttle valve opening degree signals of seven different levels corresponding to seven combinations of bit signals, i.e., H-signals (high-level signals) and L-signals (low-level signals), of three contacts L1, L2 and L3 on a code board. When the accelerator pedal is free, the contact IDL of the throttle valve opening degree detector SS is HIGH. That is, when the contacts L1, L2 and L3 are ON, the outputs of the buffer amplifiers DR6, DR7 and DR8 go LOW because resistors R15, R16 and R17 are connected in series respectively to the buffer amplifiers DR6, DR7 and DR8, so that the input ports P8, P9 and P10 of the CPU go LOW. When the three contacts L1, L2 and L3 are OFF, power is supplied through pull-up resistors R18, R19 and R20 and through the series resistors R15, R16 and R17 to the buffer amplifiers DR6, DR7 and DR8, so that the inputs of the buffer amplifiers R6, R7 and R8 go HIGH and the input ports P8, P9 and P10 of the CPU go HIGH. When the common contact IDL is ON, the base current of a transistor Q3 flows through a resistor R21 and a diode D2, and the transistor Q3 is ON, so that a voltage is applied across a resistor R23 and the input port P11 of the CPU goes HIGH. When the common contact IDL is OFF, the transistor Q3 is OFF because a resistor R22 is connected to the base of the transistor Q3, a resistor R23 drops to ground potential, and the input port P11 of the CPU goes LOW.

The input port 12 of the CPU is connected through a fuse FU to the battery BE. As resistors R24 and R25 are connected to the base of a transistor Q4 as shown in FIG. 1, the transistor Q4 is ON and hence the input port P12 of the CPU is LOW. In case the fuse FU blows out due to the malfunction of the brake system or other system of the vehicle, the transistor Q4 becomes ON, so that the input port P12 of the CPU becomes HIGH.

When the brake pedal is depressed to apply the brake, a brake switch BS is closed to light up a brake lamp BL. That is, since resistors R27 and R28 are connected to the base of a transistor Q5 as shown in FIG. 1, the transistor Q5 becomes ON when the brake switch BS is closed and the input port P13 of the CPU goes LOW. When the brake pedal is released and the brake switch BS is opened, the transistor Q5 becomes OFF and the input port P13 of the CPU goes HIGH.

A parking switch PK is closed when the shift lever is thrown to the parking position. When the parking switch PK is closed, a transistor Q6 becomes ON because resistors R30, R31 and R32 and a diode D3 are connected as shown in FIG. 1, so that the voltage across a resistor R33 drops and the input port P14 of the CPU goes HIGH. When the parking switch is opened, transistor Q6 becomes OFF, and the input port P14 of the CPU goes LOW because the resistor R33 is connected to the emitter of the transistor Q6.

A target running speed setting switch SP is operated to set a temporary target running speed in the constant-speed running controller. When the running speed setting switch SP is closed while the vehicle is running at a running speed, the present running speed is set in the constant-speed running controller as a temporary target running speed. When the target running speed setting switch SP is closed, the base current of a transistor Q7 flows through a diode D4 and a resistor R34, the transistor Q7 becomes ON, a voltage is applied across a resistor R36 and the input port P15 of the CPU goes HIGH. When the target running speed setting switch SP is opened, the transistor Q7 becomes OFF because a resistor R35 is connected to the collector and base of the transistor Q7, the resistor R36 drops to ground potential and the input port P15 of the CPU goes LOW.

A resume switch RS is closed to resume the constant-speed running control operation, after the interruption of the constant-speed running control operation, to control the running speed of the vehicle at the previously set effective target running speed. When the resume switch RS is closed, the base current of a transistor Q8 flows through a diode D5 and a resistor R37 to make the transistor Q8 ON, a voltage is applied across a resistor R39 and the input port P16 of the CPU goes HIGH. When the resume switch RS is opened, the transistor Q8 becomes OFF because a resistor R38 is connected to the collector and base of the transistor Q8, the resistor R39 drops to ground potential and the input port P16 of the CPU goes LOW.

The pressure condition of a surge tank for storing a fluid of negative pressure for actuating the constant-speed running controller is detected by a vacuum switch VS. When the pressure of the surge tank drops, the vacuum switch VS is actuated. A negative pressure is produced in the surge tank by a vacuum pump VP which is driven by a pump motor M and is controlled by a release valve RV and a control valve CV. The negative pressure of the surge tank is detected by the vacuum switch VS. When the vacuum switch VS is ON, the base current of a transistor Q9 flows through a diode D6 and a resistor R40, so that the transistor Q9 becomes ON, a voltage is applied across a resistor R42 and the input port P17 of the CPU goes HIGH. When the vacuum switch VS is OFF, the transistor Q9 becomes OFF because a resistor R41 is connected to the collector and base of the transistor Q9, the resistor R42 drops to ground potential and the input port R17 of the CPU goes LOW.

When the common contact of a main switch ADS is connected to the ON-contact of the same, the constant-speed running controller becomes operative. When the common contact is connected to the OFF-contact of the main switch ADS, the constant-speed running controller becomes inoperative. When the common contact is connected to the ON-contact, the base current of a transistor Q10 flows through a diode D7 and a resistor R43, so that the transistor Q10 becomes ON, a voltage is applied across a resistor R45 and the input port P18 of the CPU goes HIGH. When the common contact is connected to the OFF contact, the transistor Q10 becomes OFF because a resistor R44 is connected to the collector and base of the transistor Q10, the resistor R45 drops to ground potential and the input port P18 of the CPU goes LOW.

A air conditioner control switch AC is closed to operate an air conditioning system and is opened to stop the air conditioning system. When the air conditioner control switch AC is closed, the base current of a transistor Q11 flows through a diode D8 and a resistor R46, so that the transistor Q11 becomes ON, a voltage is applied across a resistor R48 and the input port P19 of the CPU goes HIGH. When the air conditioner control switch AC is opened, the transistor Q11 becomes OFF because a resistor R47 is connected to the collector and base of the transistor Q11, so that the resistor R48 drops to ground potential and the input port P19 of the CPU goes LOW.

The connection of the output port of the CPU will be described hereinafter.

The speed of the automatic transmission is determined by selectively energizing and de-energizing a first shift solenoid SL1 and a second shift solenoid SL2, namely, actuators for determining the speed of the automatic transmission as shown in a table below.

| Shift solenoid | First | Second | Third | OD |
|---|---|---|---|---|
| SL1 | Energized | Energized | De-energized | De-energized |
| SL2 | De-energized | Energized | Energized | De-energized |

A lock-up solenoid SL3 is an actuator for determining the speed of the automatic transmission. When the lock-up solenoid SL3 is energized, the automatic transmission is locked up, when de-energized, the automatic transmission is unlocked.

Suppose that the output of a buffer amplifier DR11 is HIGH, a transistor Q21 is OFF and the first shift solenoid SL1 is de-energized, when the output port P21 of the CPU is HIGH, and that the output of the buffer amplifier DR11 is LOW, the transistor Q21 is ON and the first shift solenoid SL1 is energized when the output port P21 is LOW. When the first shift solenoid SL1 is de-energized, a pull-up resistor R54 having a high impedance is grounded through the first shift solenoid SL1 having a low impedance and hence the input port P22 of the CPU goes LOW. When the shift solenoid SL1 is energized, a current is supplied through a resistor R51 having a low impedance to the first shift solenoid SL1, the voltage of the input of the buffer amplifier DR12 drops greatly and hence the input port P22 of the CPU goes HIGH.

When the first shift solenoid SL1 has gone abnormal, for example, in case of breakage of the coil of the first shift solenoid SL1, the first shift solenoid SL1 is unable to be energized, and hence the voltage at the output of the buffer amplifier DR12 is raised to a high level by the pull-up resistor R54 and the input port P22 of the CPU goes HIGH. When the first shift solenoid SL1 is short-circuited, voltage drop across the first shift solenoid SL1 is small and hence the input port P22 of the CPU goes LOW.

Thus, when the first shift solenoid SL1 is abnormal, a signal inverse to a normal signal is applied to the input port P22 of the CPU. Accordingly, the condition of the first shift solenoid SL1 can be discriminated through the test on the conditions of the output port P21 and input port P22 of the CPU.

Suppose that the output of a buffer amplifier DR13 is HIGH, a transistor Q22 is OFF and the second shift solenoid SL2 is de-energized, when the output port P23 of the CPU is HIGH, and that the output of the buffer amplifier DR13 is LOW, the transistor Q22 is ON and the second shift solenoid SL2 is energized, when the output port P23 is LOW. When the second shift solenoid SL2 is de-energized, the input of a buffer amplifier DR14 and a pull-up resistor R55 having a high impedance is grounded through the second shift solenoid SL2 having a low impedance so that an input port P24 of the CPU goes LOW. When the second shift solenoid SL2 is energized, a current is supplied through a resistor R52 having a low impedance to the second shift solenoid SL2 and the voltage at the input of the buffer amplifier DR14 drops greatly and the input port P24 of the CPU goes HIGH.

Suppose that the output of a buffer amplifier DR15 is HIGH, a transistor Q23 is OFF and the lock-up solenoid SL3 is de-energized, when the output port P25 of the CPU is HIGH, and that the output of the buffer amplifier DR15 is LOW, the transistor Q23 is ON and the lock-up solenoid SL3 is energized, when the output port P25 is LOW. When the lock-up solenoid SL3 is de-energized, the input of a buffer amplifier DR16 and a resistor R56 having a high impedance are grounded through the lock-up solenoid SL3 and the input P26 of the CPU goes LOW. When the lock-up solenoid SL3 is energized, a current is supplied to the lock-up solenoid SL3 through a resistor R53 having a low impedance and voltage at the input of the buffer amplifier DR16 drops greatly and the input port P26 of the CPU goes HIGH.

The abnormal condition, such as short circuit and breakage of the coil, of the second shift solenoid SL2 and the lock-up solenoid SL3, similarly to that of the first shift solenoid SL1, can by discriminated.

The diodes D11, D12 and D13 are flywheel diodes. The buffer amplifiers DR11 through DR20 function as driving circuits.

The release valve RV and the control valve CV control a negative pressure actuator to determine throttle valve opening degree. In the constant-speed running mode, the present running speed is compared with the effective target running speed, and throttle opening degree is regulated so that the difference between the present running speed and the effective target running speed is reduced to zero. When the solenoid of the control valve CV is energized, the negative pressure of the surge tank is applied to the negative pressure actuator and, when de-energized, the application of the negative pressure to the negative pressure actuator is interrupted. When the solenoid of the release valve RV is de-energized, the negative pressure actuator is connected to the atmosphere and, when energized, the negative pressure actuator is disconnected from the atmosphere.

When the output port P27 of the CPU is HIGH and the output port P29 of the same is LOW, transistors Q24 and Q26 become ON to energize the solenoid of the release valve RV. When the output port P27 is LOW and the output port P29 is HIGH, the transistor Q24 and Q26 become OFF to de-energize the solenoid of the release valve RV. When the output port P28 of the CPU is HIGH and the output port P29 of the same is LOW, the transistor Q25 and Q29 become ON to energize the solenoid of the control valve CV. When the output port P8 of the CPU is LOW and the output port P29 of the same is HIGH, the transistor Q25 and Q26 become OFF to de-energize the solenoid of the control valve CV.

The negative pressure of the surge tank, which is controlled by the release valve RV and the control valve CV, is produced by the vacuum pump VP which is driven by the pump motor M. The pump motor M is actuated when the output port P30 of the CPU becomes LOW to make the output of a buffer amplifier DR20 LOW and to make a transistor Q27 ON. When the output port P30 is HIGH, the output of the buffer amplifier DR20 becomes HIGH and the transistor Q27 becomes OFF to stop the pump motor M.

The output P31 of the CPU is connected to an air conditioner control circuit, not shown. When the output port P31 is HIGH, the air conditioning system is driven through buffer amplifiers and relays. When the output port P31 is LOW, the air conditioning system is stopped.

The constant-speed running controller thus constituted operates according to the following control routines.

Referring to FIGS. 2 through 7 showing control routines to be executed by the constant-speed running controller of the present invention, upon the start of the control operation, the constant-speed running controller is initialized in steps S1 through step S5. That is, the I/O ports, not shown, are set in step S1, the output ports are initialized in step S2 and a RAM for this routine is initialized in step S3. In step S4, a decision is made as to whether or not a power supply flag is LOW. When the battery BE and the backup power supply BAC are disconnected from the constant-speed running controller, the power supply flag is LOW. When the decision in step S4 is YES, a previous correction map of corrections respectively for running speeds in a running mode in which the air conditioning system is inoperative (FIG. 9) and a previous correction map of corrections respectively for running speeds in a running mode in which the air conditioning system is operative (FIG. 10) are cleared in a step S5 to initialize the corresponding register.

Upon the completion of initialization, data at the input ports are read in step S6, the running speed of the vehicle is calculated in step S7, and acceleration is calculated in step S8. In step S9, a decision is made as to whether or not an OD (overdrive) cut flag is set to decide whether a shifting operation is to be performed. When the decision in step S9 is NO, a speed change map is searched for the present speed range in step S10 and the present speed range is determined in step S11. When the decision in step S9 is YES, the routine jumps to step S12, in which a lock-up data map is searched for a state of the lock-up clutch corresponding to the present running speed. In step S13, it is decided whether or not the present state of the lock-up clutch is appropriate.

Then, the control of the lock-up clutch for constant-speed running mode is started. In step S14, a decision is made whether or not a constant-speed running mode flag is HIGH, namely, whether or not a constant-speed running mode flag is set. When the decision in step S14 is YES, a decision is made in step S15 whether or not a running speed deviation, namely, the deviation of the present running speed from the effective target running speed, is greater than a threshold. When the decision in step S15 is YES, the torque converter of the automatic transmission is unlocked to use the torque of the torque converter. That is, the torque converter is unlocked when the running speed deviation exceeds the threshold value in the constant-speed running mode regardless of speed range. When the decision in step S14 is YES and the decision in step S15 is NO, a decision is made in step S17 whether or not the running speed deviation is small enough to allow the torque converter to be maintained in the lock-up state. When the decision in step S17 is YES, permission to maintain the torque converter in the lock-up state is given in step S18. When the decision in step S14 is NO, namely, when the constant-speed running mode flag is LOW, namely, when the constant-speed running mode is not selected, steps S15 through S18 are skipped.

The actual speed change operation is started and a timer interval is set for the timing of a speed change operation.

Figure 3:
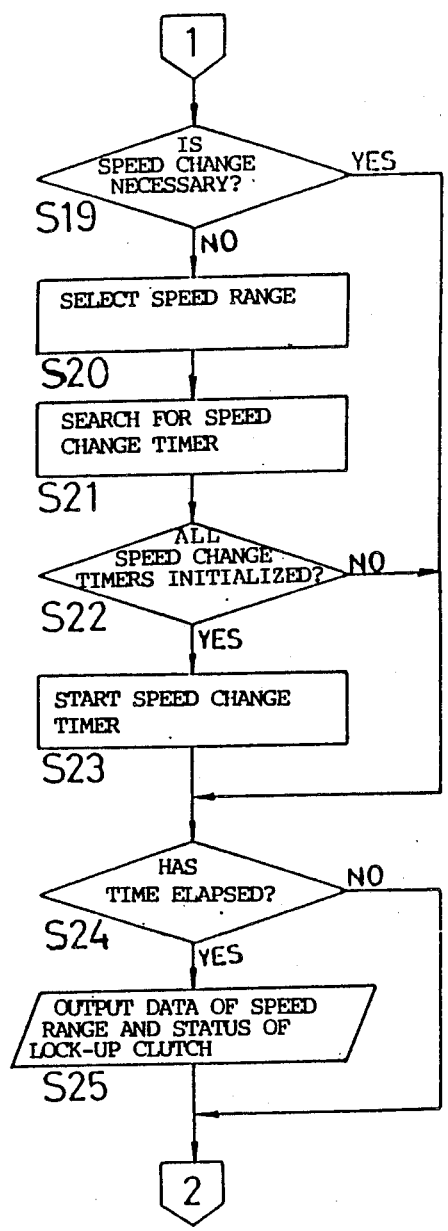
FIG. 3 is a flow chart of constant-speed running control routine including steps S19 through S25 to be executed by the constant-speed running controller of FIG. 1.

Referring to FIG. 3, a decision is made in step S19, on the basis of the results of steps S10 through S18, whether or not speed change operation is necessary. When the decision in step S19 is YES, an appropriate speed range is set in step S20. In step S21, the set time interval of a speed change timer is searched. In step S22, a decision is made whether or not all the speed change timers are initialized. When the decision in step S22 is YES, the speed change timers are started in step S23. When the decision made on the basis of the results of steps S10 through S18 is NO, steps S20 through S23 are skipped. In step S24, a decision is made whether or not a time interval to which the speed change timer is set has elapsed. When the decision in step S24 is YES, signals indicating the speed range and the status of the lock-up clutch are provided in a step S25.

Figure 4:
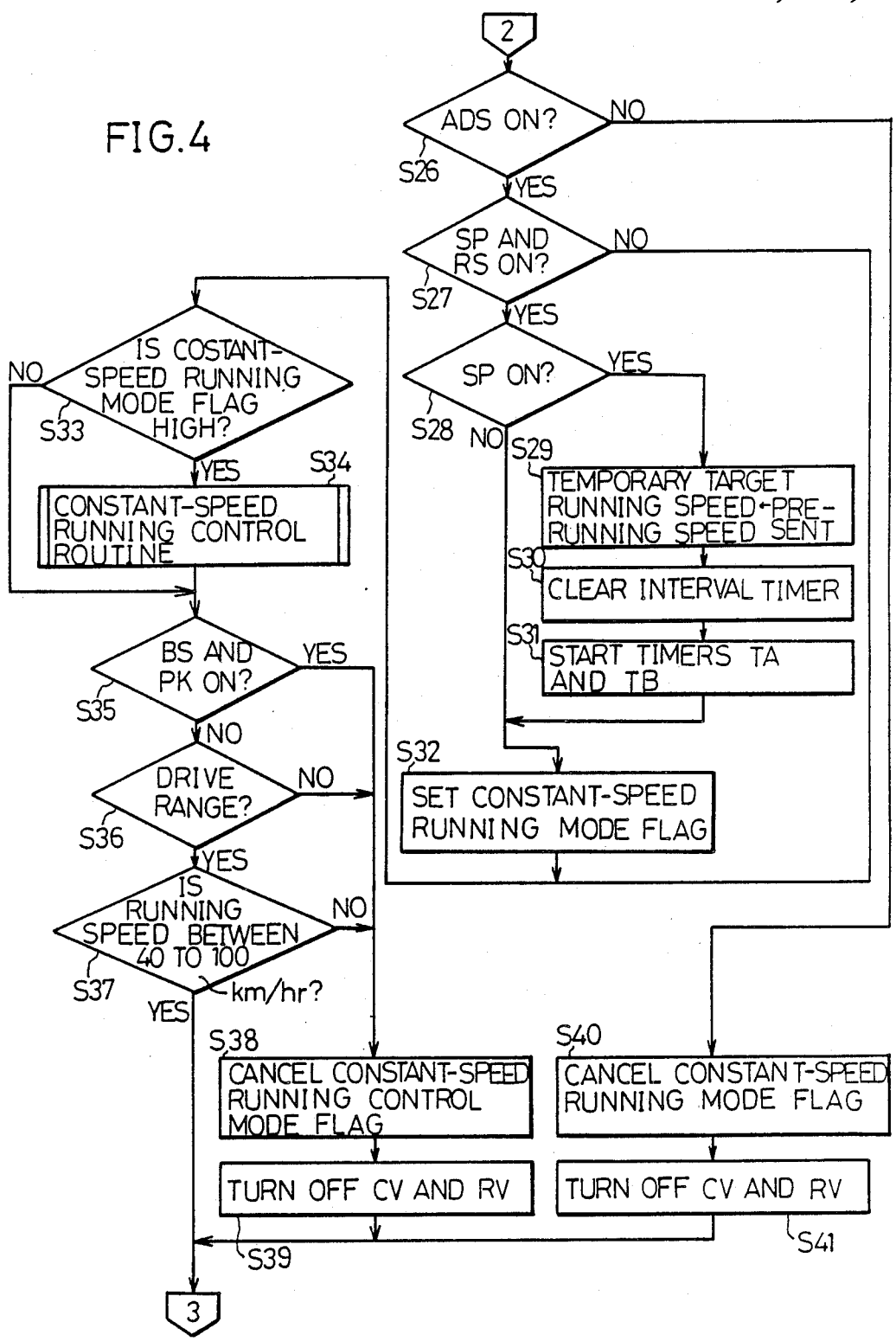
FIG. 4 is a flow chart of constant-speed running control routine including steps S26 through S41 to be executed by the constant-speed running controller of FIG. 1.

Referring to FIG. 4, in step S26, a decision is made whether or not the main switch ADS is ON. When the decision in step S26 is YES, a decision is made in step S27 whether or not a temporary target running speed for the constant-speed running mode is set, namely, whether or not the constant-speed running mode setting switch SP or the resume switch RS is ON. When the decision in step S27 is YES, a decision is made whether or not the constant-speed running control operation is started after the constant-speed running mode setting switch SP has been closed. When the decision in step S28 is YES, the resent running speed is set as a temporary target running speed in step S29. In step S30, interval timers for use in calculating the average running speed are cleared. In step S31, timers TA and TB for calculating the average running speed are started. A constant-speed running control flag is set in step S32 to start the constant-speed running control operation. When the resume switch RS is not ON, steps S29 through S31 are skipped because the effective target running speed has previously been set.

In step S33, a decision is made whether or not the constant speed running mode flag is HIGH. When the decision in step S33 is YES, a constant-speed running control routine (FIG. 8) is started.

Figure 8:
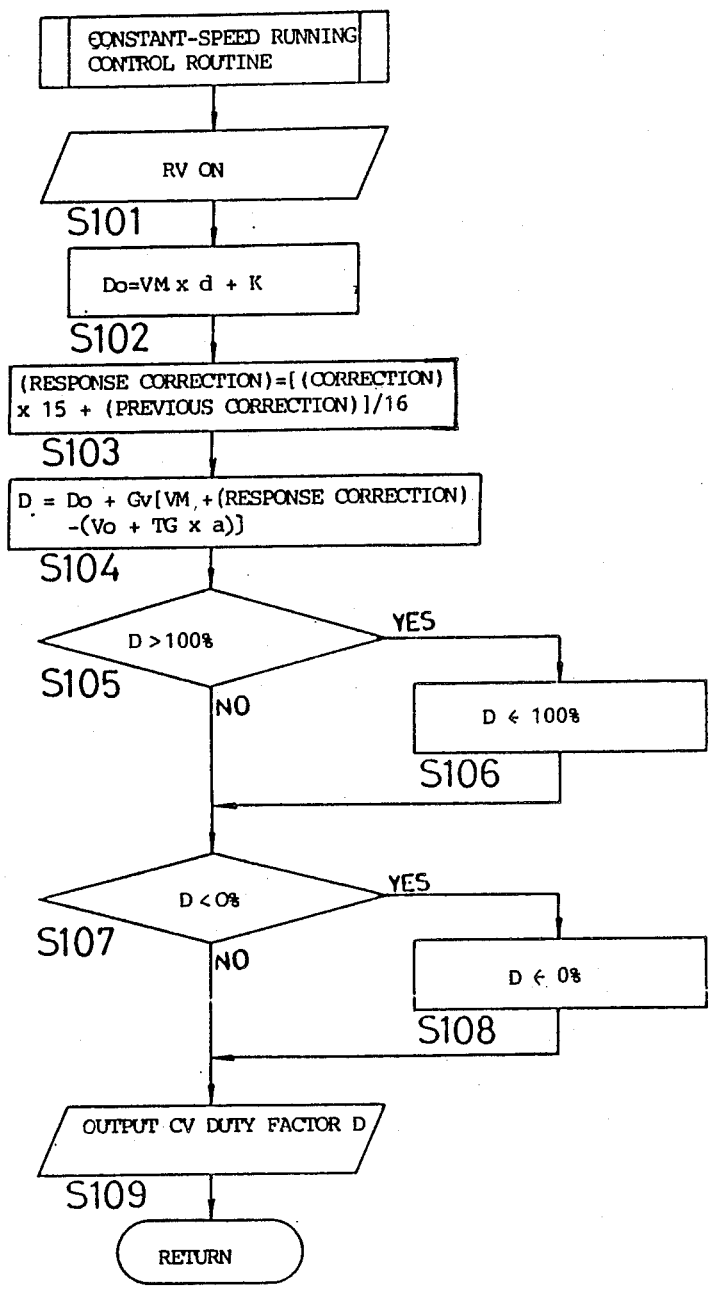
FIG. 8 is a flow chart of assistance in explaining the constant-speed running mode control routines of FIGS. 2 through 7.

Referring to FIG. 8, the solenoid of the release valve RV is energized in step S101 to make the actuator operative to enable the constant-speed running control operation. An initial set duty factor Do for a state where the deviation is zero is calculated in step S102 by using an expression:

$$Do = VM \times d + k$$

where VM is the temporary target running speed (km/hr) set by operating the target running speed setting switch SP, d is a constant corresponding to an initial set duty factor gain (%/km/hr), k is a constant, corresponding to an offset value (%) dependent on the characteristics of the actuator.

In step S103, a response correction (RC) is calculated so that a corrective operation for reducing the running speed deviation is carried out smoothly by using an expression:

$$RC = \{(\text{correction}) \times 15 + (\text{previous correction})\}/16$$

In step S104, an output duty factor D for reducing the deviation to zero is calculated by using an expression:

$$D = Do + Gv \, VM + RC - (Vo + TG \times a)\}$$

where GV is a constant corresponding to deviation gain (%/km/hr), Vo is the present running speed (km/hr), TG is a constant corresponding to a compensation time (sec), and a is the present acceleration (km/sec$^2$). When the present running speed Vo is lower than the temporary target running speed VM, the negative running speed differential is compensated by increasing the duty factor D. When the vehicle is being accelerated at an acceleration a, the duty factor D is reduced because the negative running speed differential can be compensated at a higher response speed. A response correction obtained through learning is added.

If it is decided in step S105 that the calculated duty factor D is greater than 100%, the duty factor D is set at 100% in step S106, because the duty factor D can never exceed 100%. If it is decided in step S107 that the calculated duty factor D is smaller than 0%, the duty factor is set at 0% in step S108, because the duty factor D can never be below zero. The duty factor D thus determined is provided in step S109 to drive the control value CV at the duty factor D.

Referring again to FIG. 4, steps for discriminating conditions for cancelling the constant-speed running mode are executed when the decision in step S33 is NO. When it is decided that neither the brake switch BS nor the parking switch PK is ON (step S35, that the drive range is selected (step S36) and that the running speed is not in the lowest target running speed range of 40 to 100 km/hr (step S37), the constant-speed running mode flag is cancelled (LOW) in step S38, and then the respective solenoids of the control valve CV and the release valve are de-energized in step S39.

Figure 5:
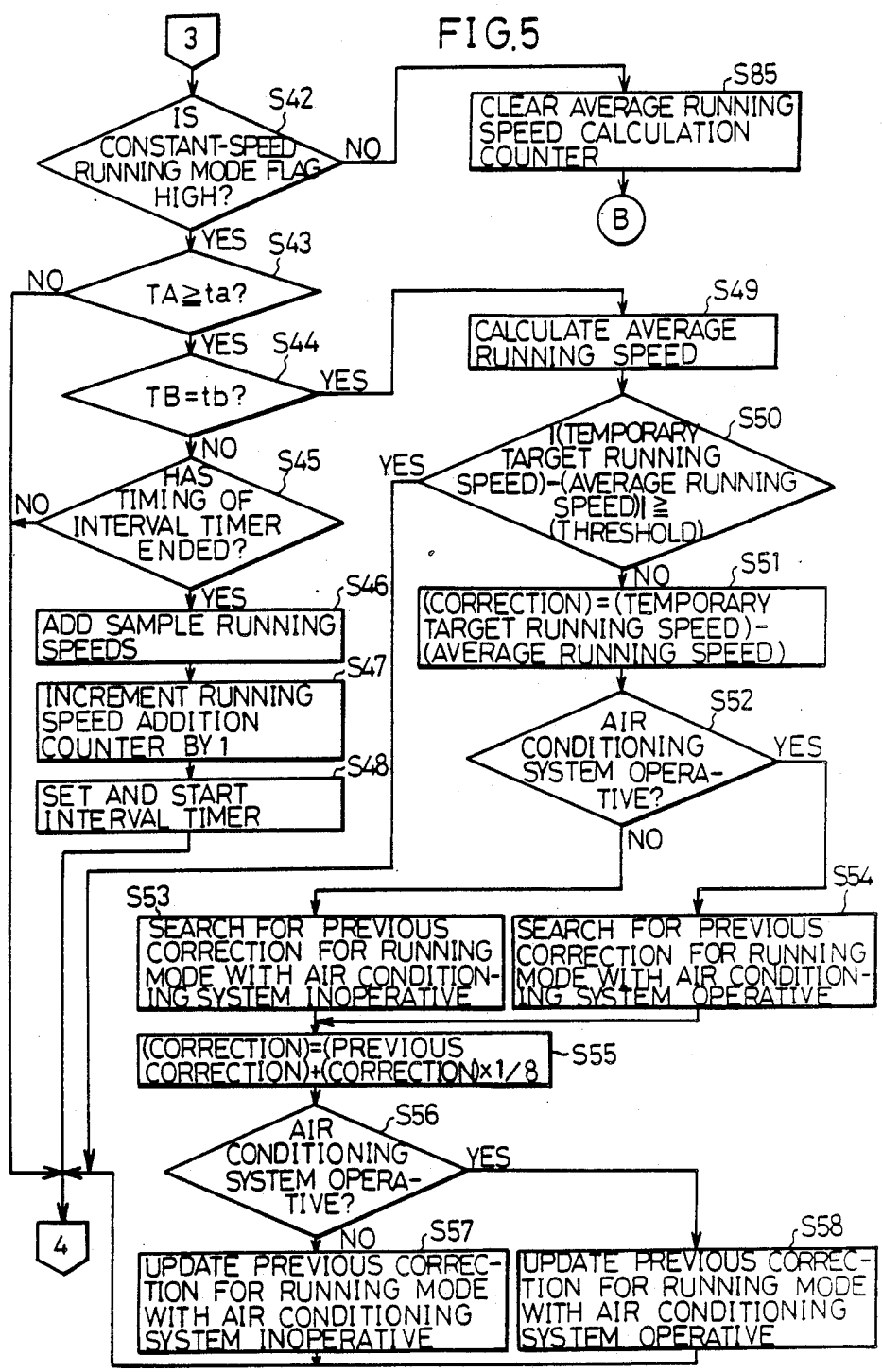
FIG. 5 is a flow chart of constant-speed running control routine including steps S42 through S58 to be executed by the constant-speed running controller of FIG. 1.

Referring to FIG. 5, a decision is made in step S42 whether or not the constant-speed control mode flag is HIGH. When the decision in step S42 is YES, an average running speed calculating routine is started. When the constant-speed running mode is not selected, the decision in step S42 is NO. Then, the average running speed counter is cleared in step S85, the OD cut flag is cancelled in step S90 (FIG. 7), and then the routine returns to step S6.

When the decision in step S42 is YES, step S43 and the following steps for calculating the average running speed are executed. In step S43, a decision is made whether or not a time interval ta, for example, three seconds, to which the average running speed calculation timer, TA for detecting the start average running speed calculation, has elapsed. If the time interval ta has elapsed after the constant-speed running mode selecting switch SP is closed, a decision is made in step S44 whether or not a time interval tb, for example, six seconds, to which an average running speed calculating timer TB for detecting the completion of the average running speed calculation, has elapsed. When the decision in step S44 is NO, a decision is made in step S45 whether or not a time interval to which an interval timer is set has elapsed. In step S46, a new present running speed is added to the sum of previously detected present running speeds every elapse of the time interval to which the interval timer is set. In step S47, the count on a running speed addition frequency counter for counting the frequency of addition of the present running speed is incremented by one every elapse of the time interval to which the interval timer is set. The interval timer is started again in step S48. When the decision in step S44 is YES, the average running speed is calculated in step S49 by using an expression:

(Average running speed)=(Sum of running speeds)/(Frequency)

In step S50, a decision is made whether or not the absolute difference between the calculated average running speed and the temporary target running speed is greater than a threshold by using a formula.

|(Target running speed)−(Average running speed)| ≧(threshold)

When the actual running speed makes a sudden change after the steps for calculating the average running speed have been started, the absolute difference is greater than the predetermined threshold, therefore the data is not used. When the absolute difference calculated in S50 is smaller than the predetermined threshold, a new correction is calculated in step S51 by using an expression.

(Correction)=(Target running speed)−(Average running speed)

In step S52, a decision is made whether or not the air conditioning system is operative. Then, the previous correction map (FIG. 9) of corrections for running speeds in a running mode in which the air conditioning system is inoperative is selected in step S53 or the previous correction map (FIG. 10) of corrections for running speeds in a running mode, in which the air conditioning system is operative, is selected in step S54 depending on the decision in step S52. In step S55, the correction is updated by using an expression:

(Correction)=(Previous correction)+(Correction)/8

In this expression, the ratio in weight between the new calculated average running speed and the previous correction in the previous correction map is 1:⅞. In step S56, a decision is made again whether or not the air conditioning system is operative. Then, the previous correction map for a running mode in which the air conditioning system is inoperative is updated in step S57 or the previous correction map for running mode in which the air conditioning system is operative is updated in step S58 depending on the decision in step S56 on the basis of the results of calculation performed in step S55.

Figure 6:
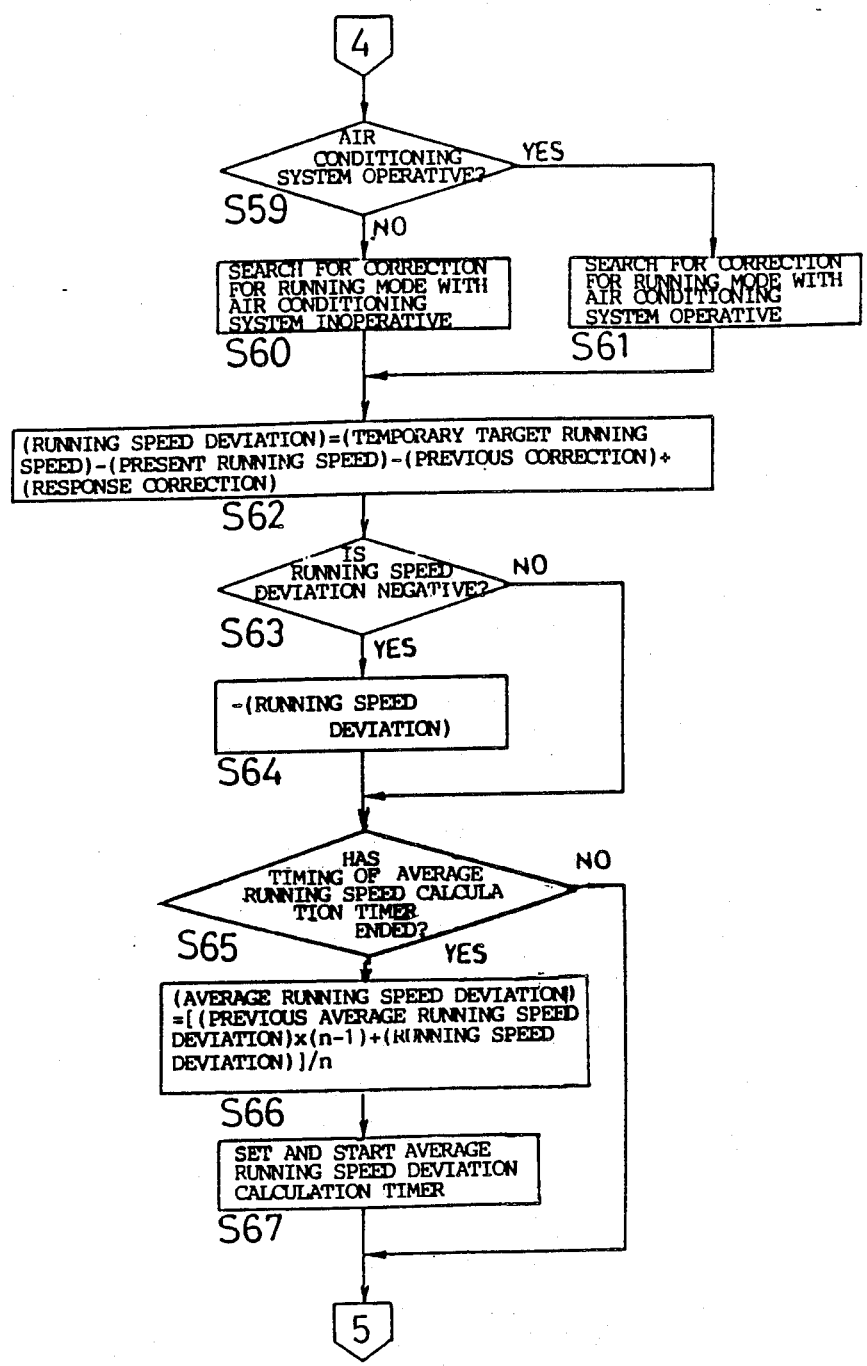
FIG. 6 is a flow chart of constant-speed running control routine including steps S59 through S67 to be executed by the constant-speed running controller of FIG. 1.

Referring to FIG. 6, in step S59, a decision is made whether or not the air conditioning system is operative. Then, the previous correction in step S60 or the previous correction map updated in step S58 for a running mode in which the air conditioning system is operative for a previous correction map updated in step S57 for a running mode in which the air conditioning system is inoperative (FIG. 9) is searched for a previous correction in step S61 depending on the decision in step S59.

The previous correction map for a running mode in which the air conditioning system is inoperative (FIG. 9) updated in the preceding control cycle is searched for a previous correction in step S60 or the previous correction map for a running mode in which the air conditioning system is operative (FIG. 10) updated in the preceding control cycle is searched for a previous correction in step S61 by the control routine including steps S43 through S59, before the average running speed is calculated.

In step S62, running speed deviation is calculated to obtain a controlled value necessary for electrical control operation by using an expression:

(Running speed deviation)=(Target running speed)−(Present running speed)−(Previous correction)+(Response correction)

and a decision is made in step S63 whether the running speed deviation is positive or negative. When the running speed deviation is negative, the running speed deviation is changed into a corresponding absolute value in step S64.

In step S65, a decision is made whether or not a time interval to which a timer for calculating an average running speed deviation from data obtained in a period has elapsed. When the decision in step S65 is YES, the average running speed deviation is calculated in step S66 by using an expression:

(Average running speed deviation)={(n−1)×(previous average running speed deviation)+(Running speed deviation)}/n where n is the number of data used for calculating the average running speed deviation. That is, the average running speed deviation is calculated every period determined by the timer for calculating the average running speed deviation, through the summation of the previous average running speed deviation weighted by (n−1)/n, calculated in the preceding control cycle and stored in the memory, and the new average running speed deviation weighted by 1/n, to prevent chattering attributable to the fluctuation of the running speed deviation. The average running speed deviation thus calculated is stored in a predetermined memory as a previous average running speed deviation. In step S67, a timer for the calculation of average running speed deviation, for timing the start of the calculation of average running speed deviation is set to a time interval on the order of 200 msec and is started.

Figure 7:
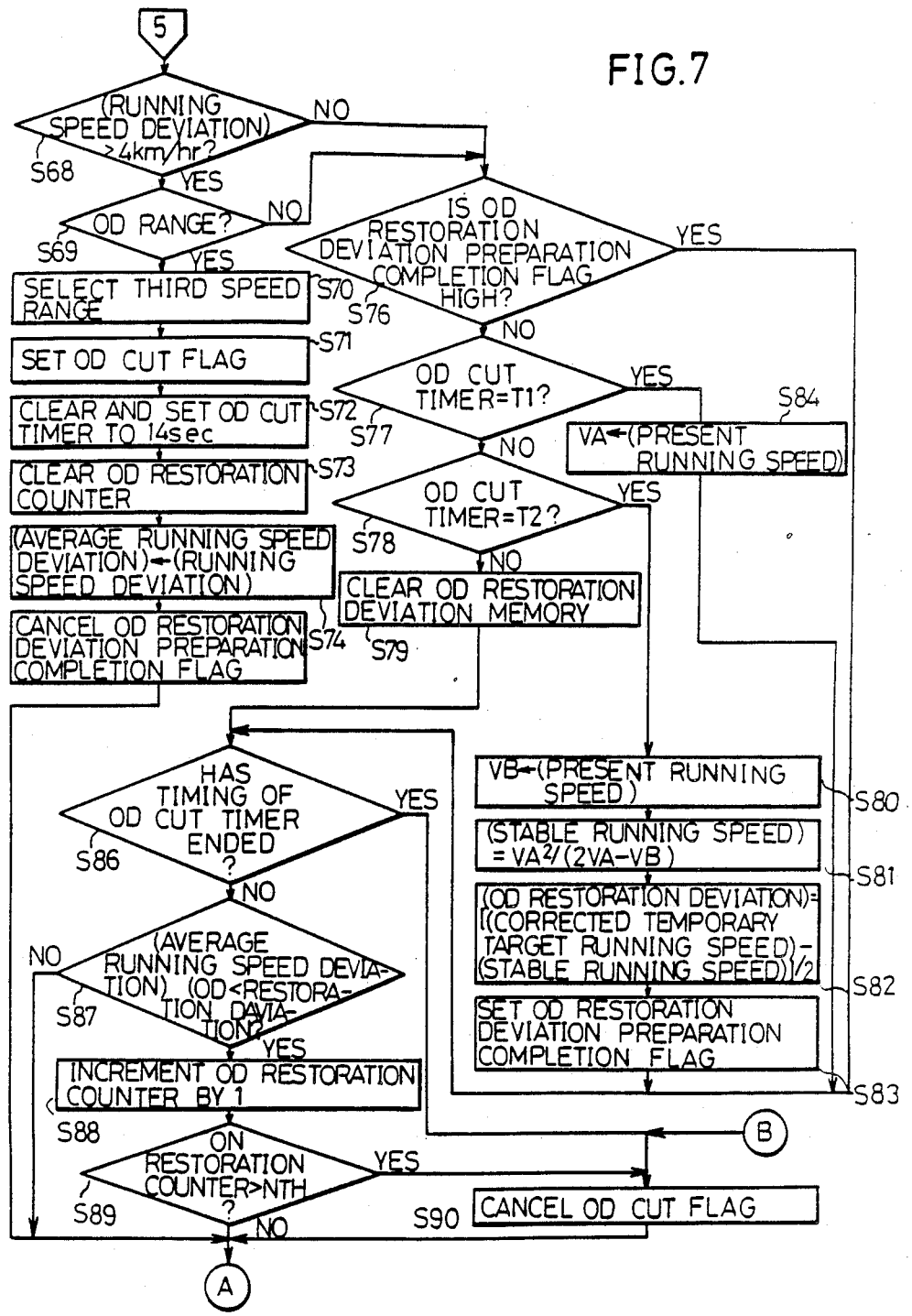
FIG. 7 is a flow chart of constant-speed running control routine including steps S68 through S90 to be executed by the constant-speed running controller of FIG. 1.

Referring to FIG. 7, in step S68, a decision is made whether or not the running speed deviation calculated in step S62 or the average running speed deviation calculated and stored in memory in step S66 is greater than a deviation, for example 4 km/hr, defining a condition for cutting the OD range. When the decision in step S68 is YES, a decision is made in step S69 whether or not the OD range is selected. When the OD range is selected, the third speed range is selected in step S70, an OD cut flag is set as HIGH in step S71, an OD cut timer is set in step S72 to a predetermined time interval, for example, 14 sec, namely, a time interval for forcibly shifting the automatic transmission from the third speed range to the OD range without entailing the influence of the running speed deviation on a running speed at which the automatic transmission is shifted from the third speed range to the OD range, and then the OD cut timer is started. In step S73, an OD restoration counter is cleared, the average running speed deviation is replaced with the running speed deviation in step S74, and an OD restoration deviation preparation completion flag is cancelled in step S75.

When the decision in step S68 is NO or when the decision in step S69 is NO, a prepartion for shifting the automatic transmission to the OD range is started.

In step S76, a decision is made whether or not an OD restoration deviation preparation completion flag is HIGH. When the decision in step S76 is NO. A decision is made in step S77 whether or not a time interval T1, for example one second, to which the OD cut timer is set has elapsed. When the decision in step S77 is NO, a decision is made in step S78 whether or not a time interval T2, for example, two seconds, has elapsed. When the decision in step S78 is NO, a memory storing an OD restoration deviation is cleared in step S79. When the decision in step S77 is YES, a memory VA is set for the present running speed in step S84 to calculate a stable running speed. When the decision in step S78 is YES, a memory VB is set for the present running speed in step S80 to calculate the stable running speed. In step S81, the stable running speed is calculated on an assumption that the response of the running speed conform to an exponential function by using an expression:

(Stable running speed)=$(VA)^2/(2VA-VB)$

In step S82, the OD restoration deviation is calculated by using an expression:

(OD restoration deviation) =

{(Corrected temporary target running speed) −

(Stable running speed)}/2 =

{(temporary target running speed) − (Previous correction) −

(Stable running speed)}/2

That is, since the running speed increases exponentially due to increase in the output torque of the automatic transmission when the automatic transmission is shifted down from the OD range to the third speed range, the running speed at which the automatic transmission can be shifted up to the OD range is estimated from the mode of increase of the running speed using the foregoing expression. However, the OD restoration deviation need not be limited to that calculated by the expression used in step S82; The OD restoration deviation may be a value between the stable running speed and the average running speed, for example, a value obtained by adding a positive value other than zero to the stable running speed.

In step S83, the OD restoration deviation preparation completion flag is set as HIGH. When the decision in step S76 is YES, steps S77 through S83 are skipped.

Then, a routine for discrimination conditions for permitting OD restoration is started.

In step S86, a decision is made whether or not the time interval for example, 14 sec, to which the OD cut timer is set, has elapsed. When the decision in step S86 is NO, a decision is made in step S87 whether or not the OD restoration deviation is greater than the average running speed deviation. When the decision in step S87 is YES, the OD restoration counter is increased by one in step S88, and then a decision is made in step S89 whether or not the content of the OD restoration counter is greater than a predetermined threshold NTH. When the decision in step S89 is YES, namely, when the running speed deviation is smaller than the OD restoration deviation by the predetermined threshold NTH even if the OD running speed deviation is fluctuating about a predetermined OD running speed deviation, or when the decision in step S86 is YES, the OD cut flag is cancelled (LOW) in step S90 to shift up the automatic transmission to the OD range, and then the routine returns t step S6. When the decision in step S89 is NO or when the decision in step S87 is NO, the routine returns to step S6.

The operation of the constant-speed running controller for detecting the average running speed, the corrections and the average running speed deviation will be described with reference to FIG. 11.

Suppose that the vehicle is running on an ordinary road of 0% in gradient, the running speed is increased and the target running speed setting switch SP is closed to start the constant-speed running. Steps S27, S28, and S29 of the control routine are executed to store the present running speed as the temporary target running speed. When the target running speed setting switch SP is closed, the timers TA and TB for calculating the average running speed are started in step S31. The time interval ta to which the timer TA is set is a time interval on the order of three seconds sufficient for the control system to regulate the running speed of the vehicle at the temporary target running speed. The time interval tb to which the timer TB is set is a time interval on the order of six seconds sufficient for the detection of the average running speed. That is, the operation for determining the average running speed is started upon the elapse of the time interval ta counted by the timer TA after the target running speed setting switch SP has been closed, and the same operation is ended upon the elapse of the time interval tb counted by the timer TB.

As shown in FIG. 11, when the target running speed setting switch SP is closed after the running speed has been increased to a running speed corresponding to a desired temporary target running speed, the actual running speed drops slightly due to time lag in response of the actuator, and then the actual running speed increases gradually to a constant running speed in the time interval ta.

Upon the elapse of the time interval ta counted by the timer TA (step S43), average running speed calculating process is started. In step S45, a decision is made whether or not the time interval to which the interval timer is set has elapsed. The interval timer is cleared in step S30. Accordingly, the present running speed is sampled in step S46 and the present running speed is sampled and added to the previously sampled running speeds in a period between the end of the time interval ta timed by the timer TA and the end of the time interval tb timed by the timer TB every time interval timed by the interval timer. In step S47, the frequency of the present running speed sampling step S46 is counted by a running speed sampling frequency counter.

The sum of the sampled running speeds is divided by the frequency counted by the running speed sampling frequency counter to obtain the average running speed. The average running speed thus obtained is used as an effective target running speed. However, if the target running speed setting switch SP is closed for the constant-speed running mode while the vehicle is running on a slope, the average running speed is different from that determined while the vehicle is running on a flat road. Therefore, to use the condition of a flat road as a standard condition, the absolute difference between the running speed at which the target running speed setting switch SP is closed and the calculated average running speed is compared with a threshold, and the calculated average running speed is regarded as an average running speed for running on a standard road, namely, a road of a standard condition, only when the absolute difference is smaller than the threshold. Then, in step S55, the new average running speed weighted by ⅛ and the previous correction weighted by 1/1 are added to obtain a new correction. That is, the average running speed determined in a single constant-speed running control cycle is weighted by ⅛ to suppress the influence of the average running speed determined by the constant-speed running control operation while the vehicle is running on a road other than a standard road. Thus, an average running speed greater than the average of eight average running speeds is obtained to improve the reliability of the constant-speed running control operation.

Since the average running speed is dependent also on the status of the air conditioning system and load on the engine of the vehicle, the correction is stored in a memory corresponding to the status of the air conditioning system.

Thus, the temporary target running speed and the average running speed, i.e., an effective target running speed, are determined through the steps of the control routine after the target running speed setting switch SP has been closed. Accordingly, the running speed deviation is calculated in step S63 by using the expression:

(Running speed deviation) =

(Temporary target running speed) − (Present running speed) −

(Previous correction) + (Response correction)

to control the controlled variable accurately.

Figure 12:
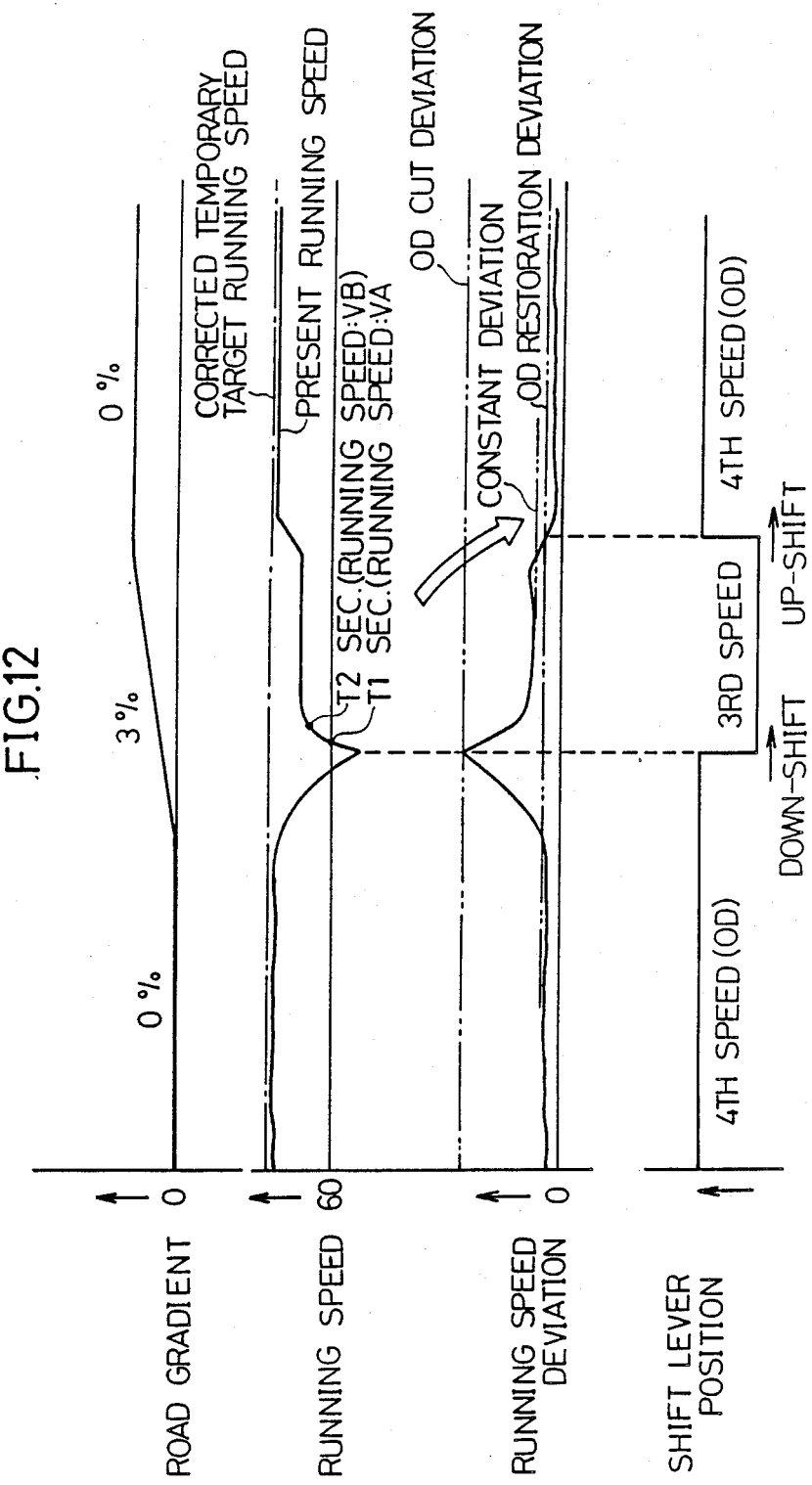
FIG. 12 is a time chart illustrating a situation in which an up-shift is permitted by estimating a stable running speed from a plurality of sampling points on a present running speed.
Figure 14:
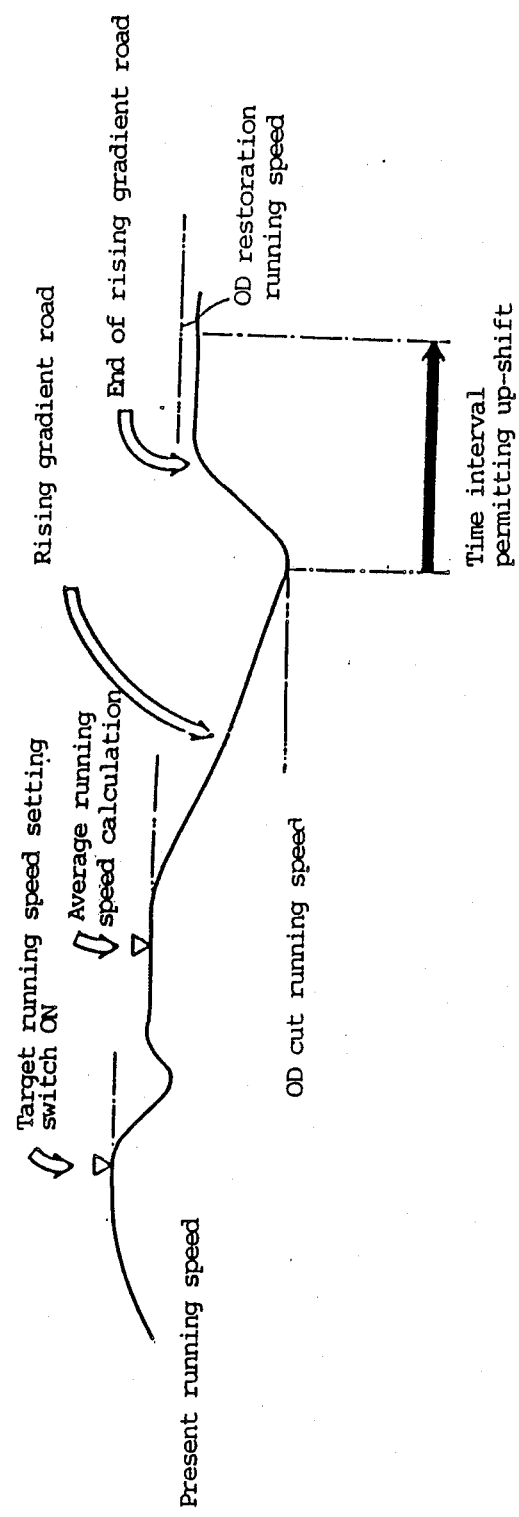
FIG. 14 is a diagram describing running speeds of a running on a rising gradient road in which a constant speed running mode has been set on a flat road running.

However, when running on a rising gradient road, a falling gradient road or a bad road and the target running speed setting switch SP is closed, an average running speed is obtained which deviates from the average running speed obtained during the running on a flat road. In this case, the learning function can minimize the influence of the rising gradient road, the falling gradient road and the bad road if their magnitude is lessened. If the target running setting switch SP is closed and opened frequently during the running on a rising gradient road, a falling gradient road or a bad road, the influence on the average running speed obtained during such running becomes greater. Since it is likely that the average running speed value obtained on the road other than a flat road is taken as the average of running speed, if the running speed deviation is decided to be the threshold (4 km/h) or more in step S68, the automatic transmission is shifted down to the third speed and a interval of 14 sec. is set to the OD cut timer in step 72. And the count-up of the OD cut timer is decided in step S86. When the 14 sec. set to the OD cut timer is found to have elapsed and even the calculation of the OD restoration deviation is not completed or the previous running speed deviation is greater than the OD restoration deviation, the OD cut flag compulsorily goes LOW in step S90. Then the automatic transmission is shifted up to the OD range by the control routine including steps S9 through S11. This operation is illustrated in FIG. 12, i.e. a time chart describing the up-shift permitting operation after a predetermined time is elapsed, and in FIG. 14, i.e. a diagram describing the running speed of a running on a rising gradient road in which the constant speed running has been set on a flat road.

Thus, when the average running speed value on other than a flat road equals the running speed average or the calculation for finding the average of the running speed is failed, and when the running speed deviation condition is for the down-shift, it is possible to perform a shift control permitting up-shift by the operation of the OD cut timer after the down-shift permission is made and a predetermined time is elapsed. As a result, the continuation of running at the third speed is prevented from occuring even when the running speed average value or the running speed deviation value is not favorable.

Next, a control for the up-shift running speed condition of the above preferred embodiment will be hereinafter described with reference to a time chart in FIG. 12. In the control, the up-shift is permitted by estimating a stable running speed, which in turn becomes a steady-state, from a plurality of sampling points on the present running speed.

If the OD restoration deviation preparation completion flag is cancelled in step S76, and if the OD cut timer content is T1 in step S77, the present running speed is set in the memory VA to calculate a stable running speed in step S84. If the OD cut timer content is T2 in step S78, the present running speed is set in the memory VB at step S80.

Assuming that the running speed is shifted from the OD range to the third speed and that the response is exponential, and let the running speeds in the memories VA and VB be VA and VB respectively at T1 and T2 sec. after the shifting, the running speeds are as follows:

$$VA = A\{1 - \exp(-T1/\tau)\} \quad (1)$$

$$VB = A\{1 - \exp(-T2/\tau)\} \quad (2)$$

where A is a constant (a stable running speed) and $\tau$ is a time constant.

From expression (2), the following expression can be derived:

$$\tau = -T2/\ln(1 - VB/A) \quad (3)$$

By substituting $\tau$ in expression (1) by expression (3), $$VA = A\{1 - \exp(\alpha)\}, \text{ where}$$
$$\alpha = T1\ln\{(1 - VB/A)\}/T2$$

Therefore, $$T2 \ln(1-VA/A) = T1 \ln(1-VB/A)$$

$$(1-VA/A)^{T2} = (1-VA/A)^{T1}$$

Here, let T1 and T2 after the shifting be 1 and 2 respectively, the above expression will be $$1 - 2VA/A + VA^2/A^2 = 1 - VB/A$$

Thus, $$A = VA^2/(2VA - VB).$$

Consequently, the stable running speed (or the above "A") will be calculated by the following expression in step S81:

Stable running speed = $VA^2/(2VA - VB)$

And the OD restoration deviation will be calculated by the following expression in step S82:

(OD restoration deviation) =

{(Corrected temporary target running speed) −

(Stable running speed)}/2

Namely, the OD restoration driving speed will be set by the following equation:

(OD restoration driving speed) =

{(Corrected temporary target running speed) +

(Stable running speed)}/2

Then the OD restoration deviation preparation completion flag is set as HIGH in step S83. If the OD restoration deviation preparation completion flag is decided to be HIGH in step S76, the control routine including steps S86 through S90 will be performed but the control routine including steps S77 through S83 are by-passed.

If the previous running speed deviation, i.e. the averaged running speed deviation, is decided to be less than the OD restoration deviation in step S87, the OD restoration counter is increased by one in S88. And the OD restoration counter content is decided whether it is greater than the predetermined threshold NTH in step S89. When the OD restoration counter content is greater than the threshold NTH, even if the previous running speed deviation fluctuates, the OD cut flag is cancelled (or set as "L") to return to the OD range in step S90 and the control routine starting at step S6 is executed. Then the OD cut flag is decided whether or not it is HIGH in step 9, and the shifting is performed. Namely, the OD restoration counter is increased by one each time the processing goes into the control routine including steps S87 through S89. However, the OD return counter increment may be made by a timer at time intervals when practicing this invention. In addition, the threshold NTH may be set in a value of 2 or more, but if it takes to much time for the OD restoration counter to reach the predetermined threshold NTH, it is not effective since it takes too much time for the automatic transmission to shift up. Further the previous running speed deviation, i.e. the averaged running speed deviation, and the OD restoration deviation are compared in this preferred embodiment. But the average running speed deviation obtained in step S66, i.e. an averaged running speed deviation, may be taken as the running speed deviation obtained in step S62 when practicing this invention, since this invention can deal with the fluctuating speed difference.

Figure 13:
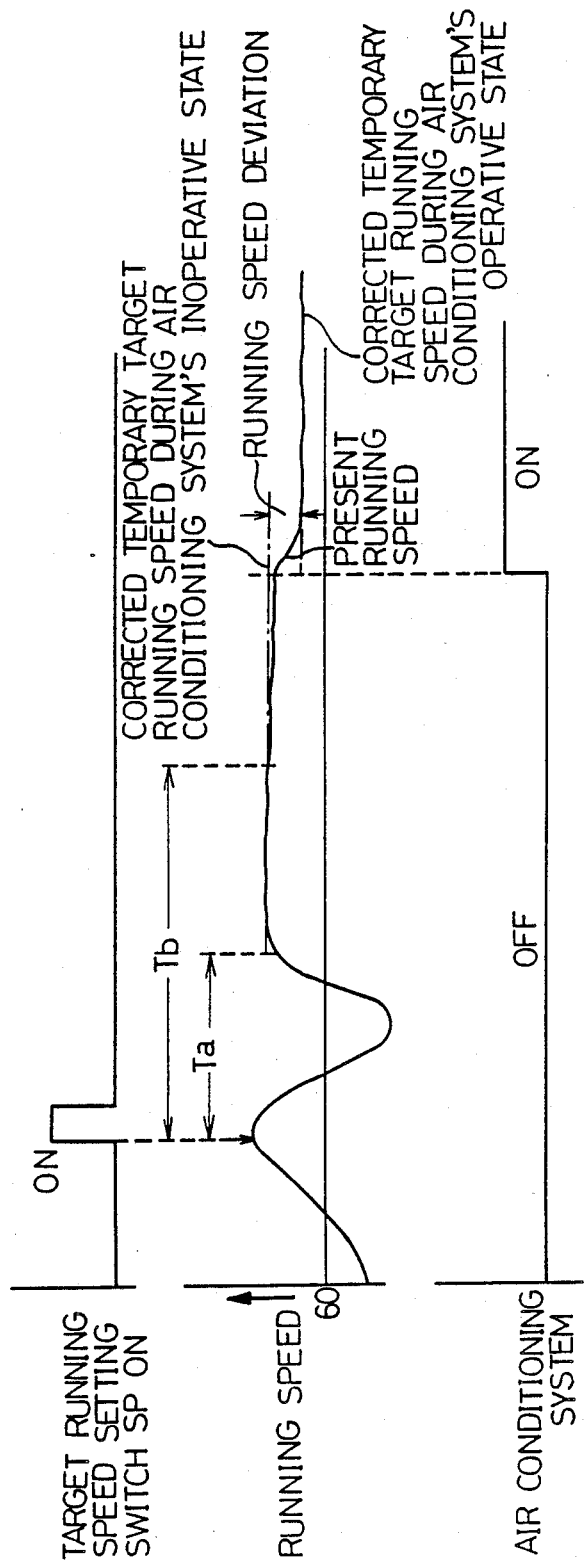
FIG. 13 is a time chart illustrating a situation in which an air conditioning system is changed from its inoperative state to its operative state.

As illustrated in a time chart in FIG. 13 in which the air conditioning system is changed from its inoperative state to its operative state, the running speed deviation, i.e. the difference between the corrected temporary target speed which is calculated when the air conditioning system is in its inoperative state, and the actual running speed, increases as the load on the engine is increased by the operation of the air conditioning system.

Therefore, this preferred embodiment has a memory for the previous correction map of corrections during the air conditioning system's inoperative state. The previous correction map is shown in FIG. 9, and provides the previous corrections in accordance with running speeds during the air conditioning system's inoperative state. And this preferred embodiment has another memory for the previous correction map of corrections during the air conditioning system's operative state. This latter previous correction map is shown in FIG. 10, and provides the previous corrections in accordance with running speeds during the air conditioning system's operative state. Thus an address for correction is selected depending on the air conditioning system's operating condition, and the corrected temporary target running speed is selected either from the corrected temporary target running speed during the air conditioning system's inoperative state or the corrected temporary target running speed during the air conditioning system's operative state by the provided previous corrections during the air conditioning system's inoperative state or by the provided previous corrections during the air conditioning system's operative state.

Thus, the constant-speed running controller of the present invention for maintaining a fixed running speed by regulating the throttle valve opening degree determines an effective target running speed on the basis of a temporary target running speed corresponding to a running speed sampled at a moment when the target running speed setting switch is closed and stored in the memory, the average running speed of actual running speed sampled in a predetermined time interval after the target running speed setting switch has been closed, and the difference between the temporary target running speed and the average running speed.

And when an abnormal value has been taken in the average value of the above running speed, there might arise a possibility in which the shift control cannot be done only by the controller described above. The possibility is solved by the operation of the OD cut timer: the shift control permitting the up-shift is done after a predetermined time is elapsed. Thus the continuation of running at the third speed is prevented from occuring even when the running speed average value or the running speed deviation value is not favorable.

In the embodiment described herein, the effective target running speed is determined by the weighted correction derived from the difference between the temporary target running speed, and the average running speed, and the weighted previous correction. It is also possible to determine the effective target running speed on the basis of the difference between the temporary target running speed and the average running speed. However, the use of the learning function further enhances the reliability of the average running speed.

Although the average running speed is determined in this embodiment by averaging the actual running speeds sampled in a predetermined time interval after the target running speed setting switch has been closed, a single actual running speed may be sampled and used instead of the average running speed. However, increase in the sampling number of actual running speeds enhances the reliability of the average running speed. Furthermore, the distribution of the sampled actual running speeds may be taken into consideration in determining the average running speed.

In determining the effective target running speed in this embodiment by using the correction, the difference between the temporary target running speed and the average running speed, and the previous correction are weighted for calculation. However, in view of the control function of an automatic control system, the effective target running speed is optional provided that the difference between the temporary target running speed and the average running speed is known.

Further the preferred embodiment's shifting condition depending on the air conditioning's operating condition is corrected as follows: a correction is obtained by selecting either the previous corrections during the air conditioning system's inoperative state or the previous corrections during the air conditioning system's operative state, and the average of the running speed deviation, i.e. the effective target running speed, is corrected with the correction. However, the shifting condition may be corrected with the running speed deviation as described above. In addition, in selecting either the previous corrections during the air conditioning system's inoperative state or the previous corrections during the air conditioning system's operative state, when either of the previous corrections is selected, the other previous corrections, i.e. the previous corrections during the air conditioning system's inoperative state or the previous corrections during the air conditioning system's operative state, can be obtained by addition by a predetermined constant. Accordingly, as the shifting condition depending on the air conditioning system's operating state, either one of the previous corrections during the air conditioning system's inoperative state or the previous corrections during the air conditioning's operative state may be set and the other may be taken as a constant for practicing this invention. Further a similar result mentioned above may be obtained by changing the running speed deviation when the air conditioning system is in operation and when it is not in operation, since the shifting condition described above eventually derives the running speed deviation.

Furthermore, in the preferred embodiment described above the average running speed is obtained by detecting the running speed of an actually running vehicle in a plurality of times in a predetermined time interval. This method can derive an average driving speed from the throttle valve opening degree when it is applied only to an automatic transmission controller.

As apparent from the foregoing description, the constant-speed running controller of the present invention determines an effective target running speed for constant-speed running control on the basis of a temporary target running speed corresponding to an actual running speed sampled at a moment when the target running speed setting switch SP is closed and stored in the memory, the average running speed determined by processing the actual running speeds sampled in a predetermined time interval after the target running speed setting switch has been closed, and the difference between the temporary target running speed and the average running speed. Accordingly, the difference between the temporary target running speed and the actual running speed can be known and the temporary target running speed can be corrected on the basis of the difference between the temporary target running speed and the average running speed for accurate running speed control.

Although the invention has been described in its preferred form with a certain degree of particularly, obviously many changes and variations are possible therein. It is therefore to be understood that the present invention may be practiced otherwise than specifically described herein without departing from the scope and spirit thereof.

What is claimed is:

1. A constant-speed running controller comprising:
   accelerating means for accelerating a vehicle;
   running speed detecting means for detecting a present running speed;
   target running speed setting means for setting up a target running speed; and
   control means for controlling said accelerating means in accordance with a speed difference between said present running speed and said target running speed;
   wherein said control means calculates an average running speed measured in a predetermined constant period after setting up said target running speed and the controlling of said accelerating means with said speed difference, calculates a correction being a difference between said target running speed and said average running speed and controls said accelerating means in accordance with said correction, to reduce said speed difference.

2. A constant-speed running controller according to claim 1:
   wherein said control means calculates a corrective duty factor being a value which is proportional to a sum of said speed difference and said correction, and proportionally controls said accelerating means in accordance with said corrective duty factor.

3. A constant-speed running controller according to claim 2:
   wherein said control means calculates an initial duty factor being a value which is proportional to said target running speed, and,
   wherein said control means proportionally controls a throttle value as said accelerating means in accordance with a sum of said initial duty factor and said corrective duty factor.

4. A constant-speed running controller according to claim 1:
   wherein said predetermined constant period is positioned after an initial idle constant period measured from a moment when said target running speed is set up.

5. A constant-speed controller according to claim 2:
   wherein said control means inhibits said calculation of said correction and employs a previous correction to control said accelerating means.

6. A constant-speed controller according to claim 2, wherein said control means memorizes first and second constant values, controls said accelerating means in accordance with a sum of said correction and said first constant value in a period of driving an air conditioner of said vehicle, and controls said accelerating means in accordance with a sum of said correction and said second constant value in a period of not driving said air conditioner, toward a direction to decrease said speed difference.

7. A constant-speed controller according to claim 2:
   wherein said vehicle comprises a torque converter having a lock-up clutch; and
   wherein said control means locks up said lock-up clutch when said speed difference becomes larger than a first predetermined constant value and cuts off said lock-up clutch when said speed difference becomes smaller than a second predetermined constant value being smaller than said first predetermined constant value.

8. A constant-speed controller according to claim 2:
   wherein said vehicle comprises an automatic transmission having a third shift, and a fourth shift called OD shift; and,
   wherein said control means controls said automatic transmission between said OD shift and said third shift in accordance with said speed difference.

9. A constant-speed running controller according to claim 2:
   wherein said control means calculates said correction at every setting of said target running speed in a period when said vehicle is running and calculates an accumulating correction being a sum of a part of said correction calculated at a present time and a part of said correction calculated at a previous time; and,
   wherein said control means accelerates said accelerating means when said accumulating correction becomes larger and decelerates said accelerating means when said accumulating correction becomes smaller.

10. A constant-speed running controller according to claim 2:
    wherein said predetermined constant period is positioned after an initial idle constant period measured from a moment when said target running speed is set up.

11. A constant-speed running controller according to claim 3:
    wherein said predetermined constant period is positioned after an initial idle constant period measured from a moment when said target running speed is set up.

* * * * *